(12) United States Patent
Cristani et al.

(10) Patent No.: US 11,175,733 B2
(45) Date of Patent: Nov. 16, 2021

(54) METHOD OF VIEW FRUSTUM DETECTION AND A CORRESPONDING SYSTEM AND PRODUCT

(71) Applicants: OSRAM GmbH, Munich (DE); Fondazione Istituto Italiano di Tecnologia, Genoa (IT); Università degli Studi di Verona, Verona (IT)

(72) Inventors: Marco Cristani, Verona (IT); Alessio Del Bue, Genoa (IT); Michael Eschey, Wehringen (DE); Fabio Galasso, Garching (DE); Irtiza Hasan, Gujranwala (PK); Herbert Kaestle, Traunstein (DE); Francesco Setti, Rovereto (IT); Theodore Tsesmelis, Loutra-Mytilene (GR)

(73) Assignees: OSRAM GMBH, Munich (DE); FONDAZIONE ISTITUTO ITALIANO DI TECNOLOGIA, Genoa (IT); UNIVERSITÀ DEGLI STUDI DI VERONA, Verona (IT)

( * ) Notice: Subject to any disclaimer, the term of this patent is extended or adjusted under 35 U.S.C. 154(b) by 115 days.

(21) Appl. No.: 16/341,467

(22) PCT Filed: Oct. 10, 2017

(86) PCT No.: PCT/IB2017/056244
§ 371 (c)(1),
(2) Date: Apr. 12, 2019

(87) PCT Pub. No.: WO2018/069826
PCT Pub. Date: Apr. 19, 2018

(65) Prior Publication Data
US 2019/0250702 A1    Aug. 15, 2019

(30) Foreign Application Priority Data
Oct. 13, 2016    (IT) ................. 102016000103076

(51) Int. Cl.
*G06F 3/01*        (2006.01)
*G06T 7/73*        (2017.01)

(52) U.S. Cl.
CPC .............. *G06F 3/012* (2013.01); *G06F 3/011* (2013.01); *G06T 7/73* (2017.01); *G06T 2207/30241* (2013.01)

(58) Field of Classification Search
None
See application file for complete search history.

(56) References Cited

U.S. PATENT DOCUMENTS

2009/0293012 A1    11/2009  Alter et al.
2015/0061998 A1     3/2015  Yang et al.
(Continued)

FOREIGN PATENT DOCUMENTS

EP    2980675 A2    2/2016
WO    2013173728 A1   11/2013

OTHER PUBLICATIONS

Valenti, R. et al.; "Combining Head Pose and Eye Location Information for Gaze Estimation"; Feb. 2012; pp. 802-815, vol. 21, No. 2, IEEE Transactions on Image Processing.

(Continued)

*Primary Examiner* — Matthew C Bella
*Assistant Examiner* — Brian D Shin
(74) *Attorney, Agent, or Firm* — Viering, Jentschura & Partner mbB

(57) ABSTRACT

An image signal indicative of the head pose of a person in a scene, as provided by a camera may be processed by estimating, as a function of the image signal received by the image sensor, the head pose of the person. A view frustum of the person may be generated from the estimated head pose. A visual frustum of attention or VFOA of the person may be generated from the view frustum. From the visual (Continued)

frustum, a predicted movement trajectory of the person or an estimated scene attention map as a function of the visual frustum of attention, preferably by identifying in the attention map at least one object to be controlled may be generated.

10 Claims, 1 Drawing Sheet

(56) References Cited

U.S. PATENT DOCUMENTS

| | | | | |
|---|---|---|---|---|
| 2015/0138069 A1* | 5/2015 | Fuchs | ............ | G06F 3/012 345/156 |
| 2015/0235453 A1* | 8/2015 | Schowengerdt | ...... | G06T 1/60 345/633 |
| 2015/0331485 A1 | 11/2015 | Wilairat et al. | | |

OTHER PUBLICATIONS

Fanelli, G. et al.; "Real Time Head Pose Estimation with Random Regression Forests"; 2011; pp. 617-624; IEEE Conference on Computer Vision and Pattern Recognition (CVPR).
Robertson, N. et al.; "Estimating gaze direction from low-resolution faces in video"; May 2006; 15 pages; European Conference on Computer Vision (ECCV).
Tosato, D. et al.; "Characterizing humans on Riemannian manifolds"; Aug. 2013; 14 pages, vol. 35, No. 8; IEEE Transaction on Pattern Analysis and Machine Intelligence.
Ricci, E. et al.; "Uncovering Interactions and Interactors: Joint Estimation of Head, Body Orientation and F-formations from Surveillance Videos"; 2015; pp. 4660-4668; IEEE International Conference on Computer Vision (ICCV).
Ba, S. et al.; "A Probabilistic Framework for Joint Head Tracking and Pose Estimation" Dec. 22, 2003; 11 pages; IDIAP, Martigny, Switzerland.
Smith, K. et al.; "Tracking the Visual Focus of Attention for a Varying Number of Wandering People"; Jul. 2008; 18 pages, vol. 30, No. 7; IEEE Transactions on Pattern Analysis and Machine Intelligence.
Jovancevic-Misic, J. et al.; "Adaptive Gaze Control in Natural Environments"; May 13, 2009; pp. 6234-6238, vol. 29, No. 19; The Journal of Neuroscience.
Taylor, T. et al.; "The view from the road: The contribution of on-road glance-monitoring technologies to understanding driver behavior"; Feb. 2013; 12 pages, vol. 58; Accident Analysis & Prevention, Elsevier Ltd.
Underwood, G. et al.; "Eye fixation scanpaths of younger and older drivers in a hazard perception task"; Feb. 2005; pp. 346-356, vol. 25, No. 4; Ophtalmic and Physiological Optics.
Benfold B. et al.; "Guiding Visual Surveillance by Tracking Human Attention"; 2009; pp. 1-11; British Machine Vision Conference (BMVC).
Setti F. et al.; "F-formation Detection: Individuating Free-standing Conversational Groups in Images"; May 2015; pp. 1-32, vol. 10, No. 5; PLOS ONE.
Fotios, S. et al.; "Using eye-tracking to identify pedestrians' critical visual tasks. Part 1. Dual task approach"; 2015; pp. 133-148, vol. 47, No. 2; Lighting Research and Technology.
Fotios, S. et al.; "Using eye-tracking to identify pedestrians' critical visual tasks, Part 2. Fixation on pedestrians"; 2015; pp. 149-160, vol. 47, No. 2; Lighting Research and Technology.

Patla, A. et al.; "How far ahead do we look when required to step on specific locations in the travel path during locomotion?"; 2003; pp. 133-138, vol. 148, No. 1; Experimental brain research.
Marigold, D.S., et al.; "Gaze fixation patterns for negotiating complex ground terrain"; Jan. 5, 2007; pp. 302-313, vol. 144, Issue 1; Neuroscience, Elsevier Ltd.
Pellegrini, S. et al.; "You'll Never Walk Alone: Modeling Social Behavior for Multi-target Tracking"; Sep. 2009; 8 pages; IEEE International Conference on Computer Vision (ICCV).
Geiger, A. et al.; "3D Traffic Scene Understanding from Movable Platforms"; May 2014; 14 pages, vol. 36, No. 5; IEEE Transactions on Pattern Analysis and Machine Intelligence.
Osram; "LIGHTIFY: smart connected light via app"; retrieved in 2019; http://www.osram.com/osramcom/tools-and-services/tools/lightify—smart-connected-light/.light=.
Vansteenkiste, P. et al.; "The visual control of bicycle steering: The effects of speed and path width"; Nov. 2012; pp. 222-227, vol. 51; Accident Analysis & Prevention, Elsevier Ltd.
Foulsham, T. et al.; "The where, what and when of gaze allocation in the lab and the natural environment"; Jul. 2011; pp. 1920-1931, vol. 51, No. 17; Vision Research, Elsevier Ltd.
Davoudian, N. et al.; "What do pedestrians look at at night?"; Jan. 2012; pp. 438-448, vol. 44; Lighting Research and Technology.
Foulsham T. et al.; "Mind Wandering in Sentence Reading: Decoupling the Link Between Mind and Eye"; 2013; pp. 51-59, vol. 67, No. 1; Canadian Journal of Experimental Psychology.
Castiello, U. et al.; "Size of the attentional focus and efficiency of processing"; Jun. 1989; pp. 195-209, vol. 73, No. 3; Acta Psychologica.
Kendon, A.; "Some functions of gaze-direction in social interaction"; 1967; pp. 22-63, vol. 26; Acta Psychologica.
Farenzena, M. et al.; "Social Interactions by Visual Focus Of Attention in a three-dimensional environment"; Jul. 2012; 8 pages, vol. 30, No. 2; Expert Systems.
Robertson, N.M. et al.; "Automatic Reasoning about Causal Events in Surveillance Video"; 2011; 19 pages; EURASIP Journal on Image and Video Processing.
Cristani, M. et al.; "Social interaction discovery by statistical analysis of F-formations"; 2011; pp. 23.1-23.12; British Machine Vision Conference (BMVC).
Vascon, S. et al.; "Detecting conversational groups in images and sequences: A robustg game-theoretic approach" 2015; pp. 11-24, vol. 143; Computer Vision and Image Understanding, Elsevier Inc.
Zhang, L. et al.; "Beyond F-formations: Determining Social Involvement in Free Standing Conversing Groups from Static Images"; 2016; 10 pages; IEEE Conference on Computer Vision and Pattern Recognition (CVPR).
Gourier, N. et al.; "Head Pose Estimation on Low Resolution Images"; 2006; 12 pages; First International Evaluation Workshop on Classification of Events, Activities and Relationships, Springer press.
Voit, M. et al.; "A Bayesian Approach for Multi-view Head Pose Estimation"; 2006; 4 pages; IEEE International Conference on Multisensor Fusion and Integration for Intelligent Systems.
Lee, D. et al.; "Fast and Accurate Head Pose Estimation via Random Projection Forests"; 2015; pp. 1958-1966; IEEE International Conference on Computer Vision (ICCV).
Ioannou, S. et al.; "Proximity and gaze influences facial temperature: a thermal infrared imaging study"; Aug. 2014; pp. 1-12, vol. 5; Frontiers in Psychology.
Insafutdinov, E. et al.; "DeeperCut: A Deeper, Stronger, and Faster Multi-Person Pose Estimation Model"; Nov. 2016; pp. 1-22; Computer Vision—ECCV, Springer press.
International Search Report based on Application No. PCT/IB2017/056244 (14 pages) dated Jan. 3, 2018 (for reference purpose only).

* cited by examiner

METHOD OF VIEW FRUSTUM DETECTION AND A CORRESPONDING SYSTEM AND PRODUCT

CROSS-REFERENCE TO RELATED APPLICATIONS

The present application is a national stage entry according to 35 U.S.C. § 371 of PCT Application No. PCT/IB2017/056244 filed on Oct. 10, 2017, which claims priority to Italian Patent Application No. 102016000103076, filed on Oct. 13, 2016; both of which are herein incorporated by reference in their entirety.

TECHNICAL FIELD

The description relates to view frustum detection. One or more embodiments may applied e.g. to the management of "smart" lighting systems.

Throughout this description, various documents will be referred to by reproducing between square parentheses (e.g. [X]) a number identifying the document in a LIST OF DOCUMENTS CITED which appears at the end of the description.

TECHNOLOGICAL BACKGROUND

Tracking is a classical problem in computer vision, which has received attention over more than 30 years, due to its importance in applications such as surveillance, medical imaging and, more recently, robotics.

Especially in robotics application, tracking has been combined with forecast, to allow early machine intervention for facilitating human tasks, e.g. opening a refrigerator when a person is approaching it.

Detection of the view frustum is a also a recent problem with high potential for modern vision applications.

The view frustum (or viewing frustum) is the region of space which may appear in on the screen of a computer, thus representing more or less what the field of view is for a notional camera. The designation "frustum" highlights the fact that the view frustum may be obtained by taking a truncation with parallel planes (that is a frustum) of the pyramid of vision. This is a practical implementation of the (ideal) cone of vision of an eye when a rectangular viewport as used in e.g. in computer graphics is considered. For that reason the term pyramid of vision is sometimes used as a synonym for view frustum.

The exact shape of the region covered by a view frustum may vary depending e.g. on the optical system considered. In most applications it may be considered to be a frustum of a rectangular pyramid.

Recent progresses in people detection enable research on their poses, including the view frustum, facilitating understanding their visual attention.

Head pose estimation studies have systematically increased in recent times in the area of computer vision. These studies are mostly in the field of human-computer interaction and affective computing [1, 2], where heads are captured with a high level of detail in controlled environments, with the aim of capturing subtle social signals or helping the analysis of the gaze.

Other works focus on individuating head pose in open scenarios, like in surveillance, where a number of persons may be captured at low resolution [3, 4, 5]. In this case, the head pose can be used to infer the visual field of view (FOV) of a human [6], that in turn can approximate the gazing activity [7]; an underlying concept is to align a cone of angles 130°-135° vertical and 200°-220° horizontal with the vector originating from the nose, orthogonal with respect to the coronal plane of the face: in this volume or space, also called the visual frustum (or, with a synonym designation, focus) of attention (VFOA) [7], fixation of the eyes may occur.

Confidence exists in that the distribution of gaze and cognitive processes are related [8, 9, 10], and estimation of the FOV may thus be a way for guessing where the attention of the subject is spent (devoted). In particular, head pose estimation in open scenarios has been applied for inferring the attention spent on shops [7], or on diverse areas of a scene [11] or to individuate so-called F-formations [5, 12].

Starting from certain theoretical investigations [13], recent studies on artificial lighting in public spaces [14, 15], inspired from neuroscience research [16, 17], have analyzed critical visual fixations of pedestrians walking in public spaces. Critical visual fixations may be different from simple fixations because they entail cognitive processes focused on the object of the fixation, while simple fixations may be the effect of daydreaming or task-unrelated thoughts [16]. For instance, thanks to eye tracking portable devices, the possibility exists of checking which objects have been (critically) fixated, categorizing them e.g. in eight categories: person, path (pathway in the direction of travel), latent threat, goal, vehicle, trip hazards, large objects, general environment. The results suggest that the path and other people are the most frequent critical observations, with a tendency for other people to be fixated at far distances and the path to be fixated at near distances.

In that respect, it was observed that head pose may represent an expressive cue for finding groups in a crowd [14] and that information about groups might improve performance of socially driven trackers [18], and permit a tracking-by-detection approach [19].

For instance, in [13] critical visual tasks that pedestrians perform while wandering are investigated by suggesting that these tasks include obstacle detection, facial recognition of other pedestrians and visual orientation, without however validating these assumptions and/or weighing the relative importance. Eye tracking was thus adopted to get quantitative results, firstly on controlled laboratory settings.

In [16], participants walk three 10 m paths; two of the paths have regularly- or irregularly-spaced footprints that subjects have to step on, while a third path has no footprints. The results show that, over 59% of total fixation time, gaze was held on the near path at a fixed distance slightly ahead of the pedestrian, with fixations on the footprints accounting for 16%. The relationship between speed and width of the VFOA is investigated in [21], where cyclists were asked to ride a 15 m path in an internal environment with three lane widths and at three different speeds. Results showed that narrower paths and higher speeds demand a more restricted visual search pattern and fewer task-irrelevant fixations. These studies have been criticized as being unnatural, taking place in constrained scenarios that lack the distracting features that are present in the real world, such as other pedestrians, buildings and eye-catching objects.

Mobile eye-tracking systems may address this problem, allowing eye-tracking to be carried out in ecological outdoor situations. The first studies of this kind showed that 21% of fixation time was directed towards people, 37% towards the path, and 37% towards other objects [22], with the percentage of fixations toward the path increasing during night hours (40-50%) [23].

These results were criticized by noting e.g. that the object or area that a person fixates does not always reflect where his or her attention is focused, due for example to daydreaming activities or task-unrelated thoughts [23, 24, 14]. Alternative protocols were studied, for example focusing on shifts in fixations, which should reflect changes in where attention is focused, with the connection between eye movements and attention still subject of studies.

For that reason, in [14, 15] the concept of critical fixation was exploited, by noting that critical visual fixations are different from simple fixations because they entail cognitive processes focused on the object of the fixation. The way to detect critical fixations is based on the presence of a secondary task: other than the primary task (walking in an environment), a secondary task has to be carried out (pressing a button after having heard an auditory stimulus). A delay in the completion of the secondary task is used to identify critical fixations. In the study of [14], already mentioned, participants were asked to walk a short (900 m) and heterogeneous route (road crossings, uneven terrain, residential areas and crowded plazas) whilst wearing an eye-tracking equipment and carrying out a dual task. As indicated, critical fixations were categorized in eight categories: person, path (pathway in the direction of travel), latent threat, goal, vehicle, trip hazards, large objects, general environment. Results showed that the more frequent critical observations are on the path (22%), people (19%) and the goal (15%) with a tendency for other people to be fixated at far distances (>4 m) and the path to be fixated at near distances (≤4 m). In addition, it is postulated that fixations at people are due to the need of perceiving their motion (speed and direction) [15].

Certain physiological studies aim at determining VFOA size (e.g. a cone of angles 130°-135° vertical and 200°-220° horizontal) [9]; in [25], it is demonstrated that there is a gradual drop-off in processing efficiency around the focus of attention.

The results of [14, 15] and similar experiments do not address the case of subjects forming groups. This may be a point of interest, since people that walk together may have a different fixation behavior with respect to single subjects; in facts, persons in a moving group, other than the individual fixations needed for path planning, may keep reciprocal eye contact to maintain social connection, that is, managing the turns in a conversation, processing non-verbal social signals etc. [26, 27].

Various studies employ VFOA in unconstrained scenarios, with no high resolution sensors to capture the precise gazing activity. Earlier works such as [3, 7] focus on VFOA estimation on low resolution images, jointly with the pose of the person, with VFOA used primarily for spotting social interactions.

In [28] head direction serves to infer a 3D visual frustum as approximation of the VFOA of a person. Given the VFOA and proximity information, interactions are estimated: the underlying idea is that close-by people whose view frustum is intersecting are in some way interacting. The same idea has been explored in [29].

More in detail, in [8], the VFOA is defined as a vector pointing to the focus of attention, thanks to an approximate estimation of the gazing direction at a low resolution, with the goal of analyzing the gazing behavior of people in front of a shop window. The projection of the VFOA on the floor was modeled as a Gaussian distribution of "samples of attention" ahead of a pedestrian in [30]: the higher the density, the stronger the probability that in that area the eyes' fixation would be present.

The modeling of [31] is more physiologically-grounded, with the VFOA characterized by a direction $\theta$ (which is the person head orientation), an aperture $\alpha=160°$ and a length l. The last parameter corresponds to the variance of the Gaussian distribution centered around the location of a person. Even in this case, samples of attention were used to measure the probability of a fixation: a denser sampling was used at locations closer to the person, decreasing in density in zones further away. The frustum is generated by drawing samples from the above Gaussian kernel and keeping only those samples that fall within the cone determined by the angle $\alpha$. In [32], the aperture of the cone is shown to be modulated in order to mimic more or less focused attention areas.

Acquiring semantics from the scene has vast application in different fields ranging from computer vision to smart lighting.

As an improvement over conventional manual switches, in the product available with OSRAM companies under the trade name of Lightify™ [20], a graphical user interface (GUI) allows the grouping of lights and their switching-via-touch on a smart device display.

Both those switching techniques have drawbacks: manual switches cannot be changed after commissioning, or without the intervention of a technician, while in Lightify™ groups are defined by lists of connected lights, which does not facilitate making their selection intuitive.

OBJECT AND SUMMARY

An object of one or more embodiments is to contribute in providing further improvements in the area of technology discussed in the foregoing.

According to one or more embodiments, such an object may be achieved by means of a method as set forth in the claims that follow.

One or more embodiments may relate to a corresponding system, as well as to a computer program product loadable in the memory of at least one processing module (e.g., a computer) and including software code portions for executing the steps of the method when the product is run on at least one processing module. As used herein, reference to such a computer program product is understood as being equivalent to reference to a computer-readable means containing instructions for controlling the processing system in order to co-ordinate implementation of the method according to one or more embodiments. Reference to "at least one computer" is intended to highlight the possibility for one or more embodiments to be implemented in modular and/or distributed form.

The claims are an integral part of the disclosure provided herein in relation to the one or more embodiments.

One or more embodiments may rely on the recognition that the visual frustum of attention (VFOA) identifies the volume of a scene where fixations of a person may occur; it can be inferred from the head pose estimation, and may be important in those situations where precise gazing information cannot be retrieved, like in surveillance scenarios with occlusion.

In the past, this has been exploited for individuating interest brought to certain areas of various environments (shops, open plazas, airport halls, etc.), or for individuating groups: one or more embodiments may rely on the recognition that VFOA estimation may be beneficial, other than in these specific applications, also more generally for addressing a multi-object tracking issue.

One or more embodiments may thus permit to take into account social theories and experimental psychology results, and provide a prediction model for tracking which uses attention maps derived form VFOA estimations. Even in noisy scenarios, such maps may allow a tracker to identify e.g. those areas where e.g. pedestrians more probably would be present in the future, by accounting for potential collisions and group formations.

One or more embodiments may provide a prediction model which is precise and robust. If associated e.g. to a tracking-by-detection approach, one or more embodiments may improve systematically the tracking performance on different benchmarks.

One or more embodiments may contemplate using VFOA for smart lighting applications, e.g. in arrangements where the human visual direction can be used for interacting with a light management system.

One or more embodiments may rely on the recognition that head pose estimation can be used to design an effective predictive model for multi-object tracking, capable of boosting in systematic way performance of conventional tracking approaches.

One or more embodiments may be based on the assumption that a robust real-time estimation of the head orientation of a pedestrian, and thus of its VFOA, may facilitate predicting his or her future close path, accounting for the other elements which are in the scene (pedestrians, obstacles).

One or more embodiments may involve creating attention maps of the scene (e.g. one for each pedestrian) that at each pixel contain the probability of passing there. For instance, these maps may be created by accumulating VFOAs at each time step, so that a steady head orientation may predict a possible path in the future with higher reliability than a frequently changing head pose. In addition, head poses of other people may be found to act on attention maps e.g. by discouraging potential trajectories that may lead to collisions.

One or more embodiments may rely on the recognition that head pose may be an expressive cue for finding groups in a crowd, e.g. thus permitting to collect attention information about the groups in the form of joint VFOAs.
In one or more embodiments these elements may be used to create maps at each point in time, which may be employed in designing prediction models for a large variety of trackers. One or more embodiments may take advantage of the ability of attention maps to boost the performance of socially driven trackers, e.g. to permit tracking by detection.

In one or more embodiments, robust real-time detection of VFOA may serve additionally as a human-lighting interaction tool, thereby improving over current methods for controlling lighting including manual wall switches at the wall.

For instance, while in conventional lighting systems plural lighting devices are controlled independently by means of several switches, in one or more embodiments a decoded VFOA may be used to address lighting devices by looking at them, thus leading to a more natural and intuitive way of human-lighting interaction.

One or more embodiments may involve combining a VFOA approach for identifying a lighting device to controlled, and a lighting control technique (wall switch or e.g. a Lightify™ arrangement) to change the light status, e.g. switching, dimming, color, thus offering the possibility of applying a decoded VFOA for light switching.

One or more embodiments, a VFOA may be combined with gesture-based control, for a complete human body-based lighting control. For instance, VFOA may used to address an "object" lighting device or source, while a hand gesture may be used to change the status thereof, thus offering the possibility of applying a decoded VFOA in conjunction with gesture-based control.

One or more embodiments may involve tracking people by using a visual frustum of attention (VFOA) as a predictive model in a context of tracking.

In one or more embodiments a VFOA may be exploited for collecting plausible locations of fixations (not precisely estimable in a surveillance scenario where the camera is far from the people) thus offering the possibility of using VFOA as supporting information e.g. in the case of occlusion.

By considering the gradual drop-off in processing efficiency around the focus of attention, one or more embodiments may adopt a VFOA with smoothed bounds.

One or more embodiments may assume that the intersection of the VFOA with the scene indicates the probable future path, and, in the case of other people within the VFOA, these may be processed in determining possible colliding areas, which will be avoided with a certain probability.

In one or more embodiments, people distributed in groups may be considered as a single subject (e.g. sharing a quite similar trajectory, with a similar destination), with an extended VFOA obtained as the merge of their individual VFOAs.

In one or more embodiments, an input visual signal may be passed on to a processing system (e.g. a processing pipeline) with head orientation of a subject first estimated followed by view frustum formulation based on the head orientation; a probabilistic attention map (or, with a synonym designation, attention mask) may then be created based on subject orientation, location and other pedestrians in the scene.

In one or more embodiments may thus involve using the VFOA in a predictive model.

BRIEF DESCRIPTION OF THE FIGURES

One or more embodiments will now be described, by way of example only, with reference to the annexed figures, wherein.

DETAILED DESCRIPTION

In the following, one or more specific details are illustrated, aimed at providing an in-depth understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

One or more embodiments may rely on signal processing possibly performed in a system 1000 suitable—in a manner known per se—to receive and process an image signal (e.g. a digital video signal) as provided by an image capture device such as e.g. a camera W. Such a system 1000 may be configured (e.g. as processing pipeline) in a manner to implement a method as exemplified in the following.

Figure 1:
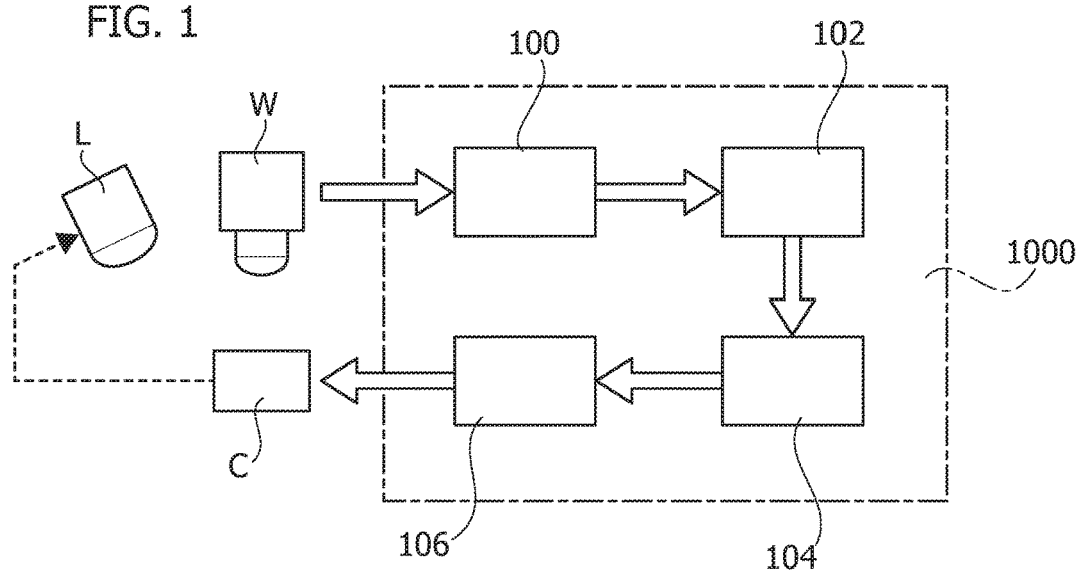
FIG. 1 is a functional block diagram exemplary of one or more embodiments.

In one or more embodiments, such a method may include a number of steps/blocks as exemplified in FIG. 1.

In brief, in one or more embodiments, an input (e.g. digital) visual signal as provided by an image capture device W (e.g. a camera) may be fed to a processing pipeline including an input module or block 100 whose output is passed on to a second module/block 102 wherein head orientation of a subject included in the image signal captured by the device W may be estimated. In a subsequent module/block 104, a view frustum may be formulated as a function of head orientation as estimated. Finally, in a module/block 106 a probabilistic attention map (or mask) may be created based on subject orientation, location and information on other pedestrians included in the scene as viewed by the image capture device W.

The probabilistic attention map (mask) thus created may be output from the system 10 e.g. for use as further discussed in the following, for instance for controlling a "smart" lighting system L.

One or more embodiments may thus contemplate steps such as:
- passing an input visual signal to a processing pipeline,
- estimating head orientation of a subject,
- formulating a view frustum based on the estimated head orientation,
- creating a probabilistic attention map (mask) based on subject orientation and location (and other possible subjects e.g. pedestrians in the scene).

One or more embodiments may contemplate steps such as:
- estimating a head pose for a subject entering a scene as detected by an image capture device (e.g. a camera W),
- generating a view frustum mask (map) as a function of the orientation of the subject based on the estimated head pose,
- creating an attention map (mask) for the subject based on the location and orientation of the subject and, possibly other subjects (e.g. pedestrians) in the scene.

One or more embodiments may contemplate steps such as:
- generating a signal representative of the position and orientation of a subject and other subjects in the scene,
- building an individual frustum thereof,
- building a group frustum,
- building an interaction frustum,
- cumulating an attention map (mask) to derive a destination point D.

Estimation of head pose is inherently a challenging task due to subtle differences between human poses.

However, several techniques ranging from low level image features to appearance-based learning architectures have been developed in order to address the problem of head pose estimation.

For instance, [33, 34] disclose using neural networks to estimate head pose.

In [11] a randomized fern-based approach is adopted to estimate head orientation. The designation randomized fern indicates an extension/variation of the concept of random forest (RF), except for the fact that in randomized fern a same test is used for all the branches which has the same depth, with the possibility of giving rise to solutions which may be computationally better than a RF.

In some cases, accuracy may be limited due e.g. to two images of the same person in different poses appearing more similar than two different persons in a same pose. Also, computing low-level image features in a low resolution images may be inherently hard and a learning architecture may contain bias based on positive and negative samples [35].

One or more embodiments may adopt a technique similar to that disclosed in [35] in order to estimate head pose in module/block/step 102.

For instance, in one or more embodiments, a head image patch may be passed as an input to a filter bank. The response from the filter bank may be sparse and contain gradient and color information of the input image. The dimensionality of sparse response may be further compressed by each node of the random forest by using random projection. Finally, this compressed filter response may be classified using a random forest.

For training, a head pose may be quantized in the range of 0° to 360° e.g. with an interval of 15°, namely with a granularity of the classification up to 15°.

In one or more embodiments, data may be randomly split into training and testing sets with a trainer classifier on manually labeled training data.

Finally, performance of the classifier may be evaluated on a test set.

For instance, one may consider a video sequence of T image frames $S=\{I_t\}_{t=1 \ldots T}$. At each frame t, a set of N pedestrians may be assumed to be detected and described by their position and orientation on the ground plane $P_{t,i}=[x_{t,i}, y_{t,i}, \alpha_{t,i}]$, $i=1 \ldots N$.

For each pedestrian at frame t, a personal frustum $\mathcal{F}^{\mathcal{P}}_{t,i}$ may be computed as a Gaussian distribution on the variable θ in polar coordinates, with mean value $\alpha_{t,i}$ and standard deviation σ:

$$\mathcal{F}^{\mathcal{P}}_{t,i}(x, y) = \frac{1}{\sigma\sqrt{2\pi}} e^{-\frac{|\theta - \alpha_{t,i}|}{2\sigma^2}}$$

where $\hat{\theta} = \arctan\left(\frac{y - y_{t,i}}{x - x_{t,i}}\right)$.

If one assumes that people interacting in a group are walking towards a common destination point, the possibility exists of treating them as a single person by assigning to all of them the a same group frustum $\mathcal{F}^{\mathcal{G}}_{t,i}$ defined as the average of all the personal frustums of the individuals belonging to the group:

$$\mathcal{F}^{\mathcal{G}}_{t,i} = \begin{cases} \frac{1}{|G|} \sum_{j \in G} \mathcal{F}^{\mathcal{P}}_{t,j} & \text{if } i \in G \\ \mathcal{F}^{\mathcal{P}}_{t,i} & \text{otherwise} \end{cases}$$

where G is a generic group of interacting people.

Moreover, one may assume that people trying to avoid collisions with other individuals may not focus on their target location if someone is on their line of sight.

Thus, one may generate an interaction frustum $\mathcal{F}^{\mathcal{I}}_{t,i}$ by subtracting from the group frustum of the subject all the group frustums related to pedestrians that:

(1) are within the highest region of the view frustum of the subject, (2) are pointing their own frustum towards the subject, and (3) are closer than a distance threshold.

This may be expressed in mathematical terms as:

$$\mathcal{F}^{\mathcal{I}}_{t,i} = \mathcal{F}^{\mathcal{G}}_{t,i} - \sum_j \frac{\mathcal{F}^{\mathcal{G}}_{t,j}}{d_{ij}}$$

$$\forall j : \mathcal{F}^{\mathcal{G}}_{t,i}(x_{t,j}, y_{t,j}) \geq \tau_p \text{ and}$$

$$\|\alpha_{t,i} - \alpha_{t,j}\| \geq \pi \text{ and } d_{ij} \leq \tau_d$$

where $d_{ij}$ is the Euclidean distance between person locations i and j, while $\tau_p$, and $\tau_d$ are two thresholds whose values may be set e.g. to 0.8 and 2 meters, according e.g. to sociological literature [36].

The interaction frustums of a single subject as generated in module/block/step 104 in FIG. 1 may then be accumulated over time to generate an attention map or mask $\mathcal{A}_{t,i}$ for each pedestrian at time t, as given e.g. by:

$$\mathcal{A}_{t,i} = \sum_{\tau=1}^{t} \mathcal{F}^{\mathcal{I}}_{\tau,i}$$

Based on such an attention mask, a most plausible destination point $D_{t,i}$ for the path of the specific pedestrian may be estimated e.g. for use in predicting the next location.

In one or more embodiments the destination point may be defined as the peak (maximum) of the attention mask.

In those cases, where the attention mask is multi-model (e.g. it exhibits multiple local pixel maxima) the destination point may be defined as, the local peak/maximum that is better aligned with the current head orientation:

$$D_{t,i} = \underset{M}{\operatorname{argmax}} \langle \hat{\theta}_{M,P_{t,i}}, \hat{\alpha}_{t,i} \rangle$$

where M is a generic local peak/maximum of $\mathcal{A}_{t,i}$, $\hat{\alpha}_{t,i}$ is a unit vector with orientation $\alpha_{t,i}$, $\hat{\theta}_{M,P_{t,i}}$ is a unit vector with orientation $M - [x_{t,i}, y_{t,i}]T$, and $\langle -, - \rangle$ represents the inner product of two vectors in the Euclidean space.

Figure 2:
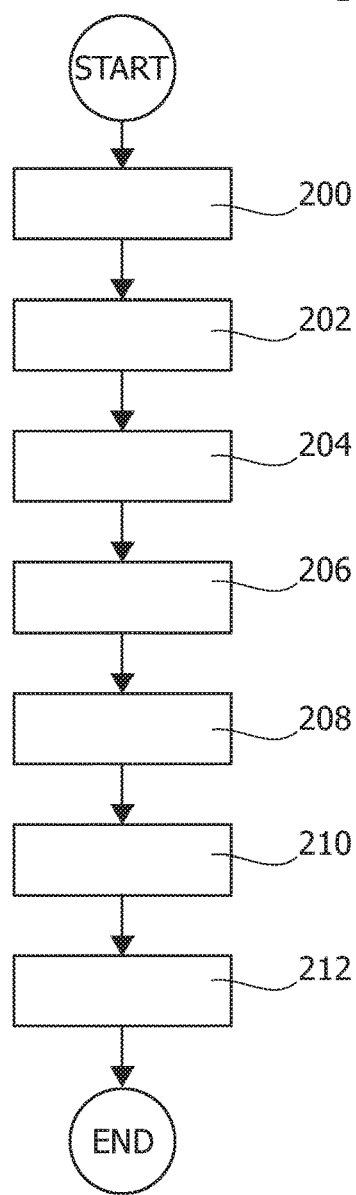
FIG. 2 is a flow chart exemplary of possible steps in one or more embodiments.

The block diagram of FIG. 2 is exemplary of a possible embodiment of the process just described.

Once information on the position and orientation of all the pedestrians in a certain scene is acquired in step 200, a personal frustum can be generated in step 202 as a Gaussian distribution over the orientation as discussed previously.

Step 204 is exemplary of a situation where e.g. two pedestrians, namely Pedestrian 1 and Pedestrian 2 are detected as belonging to a same group, so that a group frustum may be generated by merging in a step 206 as discussed previously.

A further pedestrian, say Pedestrian 5 may then be assumed to interact with. Pedestrian 1 since he/she satisfies the three conditions considered in the foregoing, and his/her frustum may be subtracted to the subject's one in a step 208.

As discussed previously, accumulation on the attention mask may then occur in a step 210 to find a destination point D.

The instant discussion assumes, by way of example, that other pedestrians in the scene (for instance Pedestrians 6 and 7) may not satisfy the first condition considered in the foregoing, while still other pedestrians, say Pedestrians 3 and 4, may not satisfy the second and the third conditions considered in the foregoing.

Once the attention map or mask is generated and the destination point is estimated a next location of a particular pedestrian may be predicted e.g. in step 212 by formulating an energy minimization problem.

In that respect one may assume that acceleration of a pedestrian may be low if compared with the frame rate of a video sequence as generated by an image capture device such as a camera W. This means that the velocity of pedestrian changes smoothly over the frames, the same also holding for head orientation.

For that reason, a judicious prediction may be a linear function of a state vector including the current pedestrian location and head orientation, the current velocity and the predicted velocity $$S_{t,i} = [x_{t,i}, y_{t,i}, \alpha_{t,i}, \dot{x}_{t-1,i}, \dot{y}_{t-1,i}, \dot{\alpha}_{t-1,i}, \hat{\dot{x}}_{t,i}, \hat{\dot{y}}_{t,i}, \hat{\dot{\alpha}}_{t,i}]^T$$

such that $$\hat{P}_{t+1,i} = \begin{bmatrix} 1 & 0 & 0 & \alpha & 0 & 0 & 1-\alpha & 0 & 0 \\ 0 & 1 & 0 & 0 & \alpha & 0 & 0 & 1-\alpha & 0 \\ 0 & 0 & 1 & 0 & 0 & \alpha & 0 & 0 & 1-\alpha \end{bmatrix} S_{t,i}$$

The estimation of the predicted velocity may then be formulated as an energy minimization problem.

In one or more embodiments a cost function may be adopted which is a linear combination of three different terms:

a people interaction term, which accounts for the multi-agent nature of the system, a destination term, which accounts for the goal of each individual behavior, a constant speed term:

$$C = I + w_D D + w_S S$$

In one or more embodiments a constant speed may be favored (regularized) in the model by defining the term S as the squared norm of the acceleration:

$$S = \|\mu \hat{\ddot{P}}_{t,i}\|^2$$

In one or more embodiments, the destination term may be the additive inverse of the angle included between the destination point, the current location and the predicted velocity:

$$D = -(\angle D_{t,i} P_{t,i} \hat{\dot{P}}_{t,i})$$

For the interaction potential, various different models nave been proposed in the literature, mostly based on the concept of social force.

For instance, one or more embodiments may employ the avoidance model presented in [18]. In that model, the interaction potential is presented as a repulsion force that penalizes predictions generating configurations where two pedestrians are going to be closer than a comfort threshold. The underlying idea is that a person would not allow another individual to enter his/her personal space; thus people, when walking, may adjust their velocity in order to avoid this kind of situation to occur.

From a mathematical viewpoint, this term may become a weighed summation over all the individuals in the scene (not considering the subject itself) of the distances between the predicted locations $$I = \sum_{j \neq i} w_j e^{-\frac{d_{ij}^2}{2\sigma^2}}$$

where $$d_{ij}^2 = \left\| \hat{P}_{t,i} - (P_{t,j} - \dot{P}_{t-1,j}) \right\|^2$$

Robustness of such a prediction model may be validated by injecting it into two different kinds of track approaches (e.g. a Kalman filter approach and a particle filter approach).

In one or more embodiments, the predicted position of a person may be used with high probability assigned to the search region around the predicted locations in the following frames, thus being in a position to suppress (e.g. reject) false associations by simply limiting the search area.

In one or more embodiments processing as highlighted in the foregoing may be exploited for lighting control, e.g. for controlling operation of one or more lighting sources (devices) schematically represented as L in FIG. 1. While a single lighting source or device L is indicated in FIG. 1 for the sake of simplicity, one or more embodiments may be applied to controlling lighting systems including a plurality of lighting sources or devices L.

For instance, in one or more embodiments, given a person in a room, the visual frustum of attention (VFOA) as generated in block/module/step 106 of FIG. 1 may be decoded thus identifying the direction the person is looking at.

An "object" light in the room may then be identified which corresponds (e.g. is closer or closest) to the direction line of the VFOA of the person.

In one or more embodiments, each one of a plurality of lighting sources/devices in a room may be identified by its location coordinates x, y, so that a line originating from the person and directed along the VFOA may permit to identify a lighting source/device as the one for which the point (light position) to the line (VFOA) distance is minimum, in the ground plane of the map.

The distance from a generic line ax+by+c=0 to point $(x_0, y_0)$ can be estimated as:

$$dist(ax + by + c = 0, (x_o, y_o)) = \frac{|ax_o + by_o + c|}{\sqrt{a^2 + b^2}}$$

The lighting source/device thus identified may then be controlled by means or a control system C which may include any of:
- a wall switch: in this case, while notionally "common" to e.g. shared by plurality of sources/devices, the wall switch will affect only the "object" light identified via the VFOA of the person,
- a mobile communication device such as e.g. a smart phone equipped with a corresponding application (app): in this case all commands may be intended to affect only the object light identified via the VFOA of the person;
- a human gesture sensor: such a sensor may implement e.g. an image-based pose estimation method to recover the position/posture of the person starting from the position of his body and limbs as sensed.

For instance, an arrangement such as DeeperCut as disclosed in [37] may be adopted for pose estimation in one embodiments. By way of example (without loss of generality) one may consider that raisin and lowering a user's right hand may produce dimming up and down the object light identified via the VFOA of the user.

In one or more embodiments may thus permit:
- people path prediction with the use of the view frustum,
- people tracking with the use of the view frustum,
- people attention map (mask) estimation with the use of the view frustum,
- use for human lighting interaction.

One or more embodiments may provide trajectory forecasting based on VFOA.

People tracking based on VFOA, e.g. with path prediction may benefit from a tighter and more robust search area: the predicted position of a person at the following frames may be used as a starting point for searching a new true location of a person.

One or more embodiments may provide people attention map estimation based on a view frustum.

For instance, a regressed VFOA may permit to estimate a scene attention map (e.g. a normalized VFOA-map summing the VFOA's of all the pedestrians in a scene). This may highlight the foci of attention of people in the scene, that is which areas in an observed image are mostly and more likely looked at.

One or more embodiments may provide for using VFOA for human-lighting interactions. For instance, an object lighting source/device may be identified on a map as the source/device to which control commands (as applied e.g. via a wall switch, a smart app or via human gestures) are directed, e.g. by "routing" the action of a switch to a "visually" targeted luminaire.

One or more embodiments may provide a method including receiving (e.g. 100) from at least one image sensor (e.g. a digital camera W) an image signal indicative of the head pose of at least one person, the method including processing said image signal by:
- estimating (e.g. 102), as a function of said image signal received from at least one image sensor, said head pose of said at least one person,
- generating (e.g. 104) from said estimated head pose a view frustum of said at least one person,
- generating (e.g. 106) from said view frustum a visual frustum of attention or VFOA of said at least one person, and
- generating from said visual frustum of attention at least one of:
  - a predicted movement trajectory of said at least one person, or
  - an estimated scene attention map for said at least one person as a function of said visual frustum of attention.

One or more embodiments may include tracking said at least one person as a function of said predicted movement trajectory, e.g. for activating automatically lighting devices along his or her path of travel.

One or more embodiments may include identifying in said attention map at least one object (e.g. a lighting device L) to be controlled.

One or more embodiments may include controlling by a control device (e.g. C) said at least one object identified in said attention map.

One or more embodiments may include identifying in said attention map at least one lighting device to be controlled.

One or more embodiments may include controlling said at least one lighting device by a control device, said control device optionally including one of:
a switch,
a mobile communication device,
a human gesture sensor.

One or more embodiments may include:
providing a plurality of lighting devices controllable by one control device,
identifying in said attention map at least one lighting device to be controlled in said plurality of lighting devices, and
controlling via said one control device the lighting device identified in said plurality of lighting devices in said attention map.

One or more embodiments may include, for a plurality of persons in a scene:
generating (e.g. 202) respective personal view frustums for said plurality of persons,
computing (e.g. 204) an average group view frustum of the respective personal frustums of a group of persons in said plurality of persons,
generating (e.g. 206) an interaction frustum for one person in said group by subtracting from said group frustum the view frustums related to persons in said group which:
i) are within the highest region of the view frustum of said one person,
ii) are pointing their view frustum towards said one person, and
iii) are closer than a distance threshold to said one person, and
cumulating over time the interaction frustum for said one person thereby producing an attention map for said one person.

One or more embodiments may include calculating an estimated destination point for said one person as a peak of said attention map.

One or more embodiments may include:
detecting the head orientation of said one person, and
calculating said estimated destination point as a peak in said attention map best matching said head orientation detected.

One or more embodiments may include tracking said one person by:
providing an attention map and an estimated destination point for said one person, and
predicting a next location for said one person as a function, optionally as a linear function, of the current location, the head pose, the current velocity and a predicted velocity of said one person.

One or more embodiments may provide a system including:
at least one image sensor (e.g. a camera W) for generating an image signal indicative of the head pose of at least one person,
a processing system (e.g. 1000) coupled with said at least one image sensor for receiving from said at least one image sensor said image signal, the processing system configured for processing said image signal according to one or more embodiments.

One or more embodiments may relate to a computer program product, loadable in at least one processing system (e.g. the system 1000) and including software code portions for performing the method of one or more embodiments when the product is run on at least one processing system.

LIST OF DOCUMENTS CITED

[1] Roberto Valenti, Nicu Sebe, and Theo Gevers, "Combining head pose and eye location information for gaze estimation" IEEE Transactions on Image Processing, vol. 21, no. 2, pp. 802-815, 2012.

[2] Gabriele Fanelli, Juergen Gall, and Luc Van Gool, "Real time head pose estimation with random regression forests" in IEEE Conference on Computer Vision and Pattern Recognition (CVPR), 2011.

[3] N. Robertson and I. Reid, "Estimating gaze direction from low-resolution faces in video" in European Conference on Computer Vision (ECCV), 2006.

[4] Diego Tosato, Mauro Spera, Matteo Cristani, and Vittorio Murino, "Characterizing humans on riemannian manifolds" IEEE Transactions on Pattern Analysis and Machine Intelligence, vol. 35, no. 8, pp. 1972-1984, 2013.

[5] Elisa Ricci, Jagannadan Varadarajan, Ramanathan Subramanian, Samuel Rota Bulò, Narendra Ahuja, and Oswald Lanz, "Uncovering interactions and interactors: Joint estimation of head, body orientation and formations from surveillance videos" in IEEE International Conference on Computer Vision (ICCV), 2015.

[6] Sileye O. Ba and Jean-Marc Odobez, "A probabilistic framework for joint head tracking and pose estimation" in IEEE International Conference on Pattern Recognition (ICPR), 2004.

[7] Kevin Smith, Sileye O. Ba, Jean-Marc Odobez, and Daniel Gatica-Perez, "Tracking the visual focus of attention for a varying number of wandering people" IEEE Transactions on Pattern Analysis and Machine Intelligence, vol. 30, no. 7, pp. 1212-1229, 2008.

[8] Jelena Jovancevic-Misic and Mary Hayhoe, "Adaptive gaze control in natural environments" The Journal of Neuroscience, vol. 29, no. 19, pp. 6234-6238, 2009.

[9] T. Taylor, A. K. Pradhan, G. Divekar, M. Romoser, J. Muttart, R. Gomez, A. Pollatsek, and D. L. Fisher, "The view from the road: The contribution of on-road glance-monitoring technologies to understanding driver behavior" Accident Analysis & Prevention, vol. 58, pp. 175-186, 2013.

[10] Geoffrey Underwood, Nicola Phelps, Chloe Wright, Editha Van Loon, and Adam Galpin, "Eye fixation scanpaths of younger and older drivers in a hazard perception task" Ophthalmic and Physiological Optics, vol. 25, no. 4, pp. 346-356, 2005.

[11] Ben Benfold and Ian Reid, "Guiding visual surveillance by tracking human attention" in British Machine Vision Conference (BMVC), 2009, pp. 1-11.

[12] Francesco Setti, Chris Russell, Chiara Bassetti, and Marco Cristani, "F-formation detection: Individuating free-standing conversational groups in images" PLoS ONE, vol. 10, no. 5, pp. 1-26, May 2015.

[13] J. F. Caminada and W. J. M. van Bommel, "Philips engineering report 43", 1980.

[14] S. Fotios, J. Uttley, C. Cheal, and N. Hara, "Using eyetracking to identify pedestrians-critical visual tasks, Part 1. Dual task approach" Lighting Research and Technology, vol. 47, no. 2, pp. 133-148, 2015.

[15] S. Fotios, J. Uttley, and B. Yang, "Using eye-tracking to identify pedestrians-critical visual tasks. part 2. Fixation on pedestrians" Lighting Research and Technology, vol. 47, no. 2, pp. 149-160, 2015.

[16] Aftab E. Patla and Joan N. Vickers, "How far ahead do we look when required to step on specific locations in the travel path during locomotion?" Experimental brain research, vol. 148, no. 1, pp. 133-138, 2003.

[17] Daniel S. Marigold and Aftab E. Patla, "Gaze fixation patterns for negotiating complex ground terrain" Neuroscience, vol. 144, no. 1, pp. 302-313, 2007.

[18] Stefano Pellegrini, Andreas Ess, K. Schindler, and Luc Van Gool, "You'll never walk alone: Modeling social behavior for multi-target tracking" in IEEE International Conference on Computer Vision (ICCV), September 2009, pp. 261-268.

[19] Andreas Geiger, Martin Lauer, Christian Wojek, Christoph Stiller, and Raquel Urtasun, "3d traffic scene understanding from movable platforms" IEEE Transactions on Pattern Analysis and Machine Intelligence, vol. 36, no. 5, pp. 1012-1025, May 2014.

[20] OSRAM, "Lightify—smart connected light" http://www.osram.com/osramcom/tools-and-services/tools/lightify—smart-connected-light/. light=.

[21] Pieter Vansteenkiste, Greet Cardon, Eva D'Hondt, Renaat Philippaerts, and Matthieu Lenoir, "The visual control of bicycle steering: The effects of speed and path width" Accident Analysis & Prevention, vol. 51, pp. 222-227, 2013.

[22] Tom Foulsham, Esther Walker, and Alan Kingstone, "The where, what and when of gaze allocation in the lab and the natural environment" Vision research, vol. 51, no. 17, pp. 1920-1931, 2011.

[23] N. Davoudian and P. Raynham, "What do pedestrians look at at night?" Lighting Research and Technology, p. 1477153512437157, 2012.

[24] Tom Foulsham, James Farley, and Alan Kingstone, "Mind wandering in sentence reading: Decoupling the link between mind and eye" Canadian Journal of Experimental Psychology/Revue canadienne de psychologie expérimentale, vol. 67, no. 1, pp. 51, 2013.

[25] Umberto Castiello and Carlo Umiltà, "Size of the attentional focus and efficiency of processing," Acta psychologica, vol. 73, no. 3, pp. 195-209, 1990.

[26] Adam Kendon, "Some functions of gaze-direction in social interaction," Acta psychologica, vol. 26, pp. 22-63, 1967.

[27] Adam Kendon, Conducting interaction: Patterns of behavior in focused encounters, vol. 7, CUP Archive, 1990.

[28] Loris Bazzani, Marco Cristani, Diego Tosato, Michela Farenzena, Giulia Paggetti, Gloria Menegaz, and Vittorio Murino, "Social interactions by visual focus of attention in a three-dimensional environment" Expert Systems, vol. 30, no. 2, pp. 115-127, 2013.

[29] N. M. Robertson and I. D. Reid, "Automatic reasoning about causal events in surveillance video" EURASIP Journal on Image and Video Processing, 2011.

[30] Marco Cristani, Loris Bazzani, Giulia Paggetti, Andrea Fossati, Diego Tosato, Alessio Del Bue, Gloria Menegaz, and Vittorio Murino, "Social interaction discovery by statistical analysis of f-formations" in British Machine Vision Conference (BMVC), 2011, pp. 23.1-23.12.

[31] Sebastiano Vascon, Eyasu Z. Mequanint, Marco Cristani, Hayley Hung, Marcello Pelillo, and Vittorio Murino, "Detecting conversational groups in images and sequences: A robust game-theoretic approach" Computer Vision and Image Understanding, vol. 143, pp. 11-24, 2016.

[32] Lu Zhang and Hayley Hung, "Beyond f-formations: Determining social involvement in free standing conversing groups from static images," in IEEE Conference on Computer Vision and Pattern Recognition (CVPR), 2016.

[33] Nicolas Gourier, Jérôme Maisonnasse, Daniela Hall, and James L Crowley, "Head pose estimation on low resolution images" in International Evaluation Workshop on Classification of Events, Activities and Relationships. Springer, 2006, pp. 270-280.

[34] Michael Voit, Kai Nickel, and Rainer Stiefelhagen, "A bayesian approach for multi-view head pose estimation" in 2006 IEEE International Conference on Multisensor Fusion and Integration for Intelligent Systems. IEEE, 2006, pp. 31-34.

[35] Donghoon Lee, Ming-Hsuan Yang, and Songhwai Oh, "Fast and accurate head pose estimation via random projection forests" in Proceedings of the IEEE International Conference on Computer Vision, 2015, pp. 1958-1966.

[36] Stephanos Ioannou, Paul Morris, Hayley Mercer, Marc Baker, Vittorio Gallese, and Vasudevi Reddy, "Proximity and gaze influences facial temperature: a thermal infrared imaging study", Towards an embodied science of intersubjectivity: Widening the scope of social understanding research, p. 178, 2015.

[37] Eldar Insafutdinov, Leonid Pishchulin, Bjoern Andres, Mykhaylo Andriluka, and Bernt Schiele, "Deepercut: A deeper, stronger, and faster multi-person pose estimation model," in ECCV, 2016.

Without prejudice to the underlined principles, the details and the embodiments may vary, even significantly with respect to what has been described by way of example only, without departing from the extent of protection.

The extent of protection is defined by the annexed claims.

The invention claimed is:

1. A method including receiving from at least one image sensor an image signal indicative of the head pose of at least one person, the method including processing said image signal by:

estimating, as a function of said image signal received from at least one image sensor, said head pose of said at least one person, generating from said estimated head pose a view frustum of said at least one person, generating from said view frustum a visual frustum of attention or VFOA of said at least one person, generating an estimated attention map for said at least one person based on said visual frustum of attention; and generating a respective personal view frustum for each person for a plurality of persons in a scene, determining an average group view frustum of the respective personal frustums of a group of persons in said plurality of persons, generating an interaction frustum for one person in said group by subtracting from said group frustum the view frustums related to persons in said group which:

i) are within the highest region of the view frustum of said one person, ii) are pointing their view frustum towards said one person, and iii) are closer than a distance threshold to said one person, and cumulating over time the interaction frustum for said one person and producing an attention map for said one person.

2. The method of claim 1, further comprising tracking said at least one person as a function of said predicted movement trajectory.

3. The method of claim 1, wherein the controlling occurs via a control device.

4. The method of claim 1,
wherein the at least one lighting device comprises a plurality of lighting devices.

5. The method of claim 1, further comprising determining an estimated destination point for one person as a peak of said attention map.

6. The method of claim 5, further comprising:
   detecting the head orientation of said one person, and
   determining said estimated destination point as a peak in said attention map best matching said head orientation detected.

7. The method of claim 5, further comprising tracking said one person by:
   providing an attention map and an estimated destination point for said one person, and
   predicting a next location for said one person as a function of the current location, the head pose, the current velocity and a predicted velocity of said one person.

8. A system comprising:
   at least one image sensor for generating an image signal indicative of the head pose of at least one person, and
   a processing system coupled with said at least one image sensor for receiving from said at least one image sensor said image signal, the processing system configured for processing said image signal according to the method of claim 1.

9. A non-transitory computer readable medium having stored thereon software instructions that, when executed by a processor, perform the method of claim 1.

10. The method of claim 1, further comprising generating a predicted movement trajectory of said at least one person from the visual frustum of attention.

* * * * *